United States Patent [19]

Soderberg

[11] 4,385,739

[45] May 31, 1983

[54] SYSTEM FOR ENHANCING AIRBORNE SAFETY OF AIRBORNE VEHICLES AS WELL AS REDUCING TIRE WEAR THEREOF

[76] Inventor: John V. Soderberg, 9 Fraternity La., Stony Brook, N.Y. 11790

[21] Appl. No.: 144,778

[22] Filed: Apr. 28, 1980

[51] Int. Cl.³ ............................................ B64C 25/36
[52] U.S. Cl. .................................................. 244/103 S
[58] Field of Search ..................................... 244/103 S

[56] References Cited

U.S. PATENT DOCUMENTS

| | | | |
|---|---|---|---|
| 2,414,849 | 1/1947 | Beazley | 244/103 S |
| 2,424,941 | 7/1947 | Musser et al. | 244/103 S |
| 4,040,582 | 8/1977 | Kranss | 244/103 S |
| 4,061,294 | 12/1977 | Hawkins | 244/103 S |

FOREIGN PATENT DOCUMENTS

| | | | |
|---|---|---|---|
| 628456 | 5/1963 | Belgium | 244/103 S |
| 911405 | 10/1972 | Canada | 244/103 S |

*Primary Examiner*—Charles E. Frankfort

[57] ABSTRACT

This invention relates to a system for reducing tire wear of airborne vehicles that require a runway upon which to land, wherein there is provided from an aircraft's engines, or other source, a stream of air such that the stream of air is directed against mechanical housings affixed to the wheels of the airborne vehicle, the housings comprising a number of radially spaced surfaces symmetrically positioned about the housings and thus about the wheels of the airborne vehicles such that the stream of air is directed against the radially spaced surfaces imparting to same energy thereby causing the housings and the wheels upon which the housings are mounted to rotate, resulting in controlled rotations of the wheels of the airborne vehicle at the point of landing so as to commence and continue rotation of the wheels at a regulated rate equivalent to the landing speed of the airborne vehicle prior to its landing thereby eliminating excess wear of the tires on the airborne vehicle as well as achieving an added degree of safety by providing gyroscopic stability to an airborne vehicle prior to its landing.

6 Claims, 7 Drawing Figures

SYSTEM FOR ENHANCING AIRBORNE SAFETY OF AIRBORNE VEHICLES AS WELL AS REDUCING TIRE WEAR THEREOF

BACKGROUND OF THE INVENTION

The present invention relates generally to a system for enhancing airborne safety of airborne vehicles as well as reducing tire wear thereof, and more particularly, to a system wherein means are provided for diverting from an aircraft's engines, or other source, a stream of air such that said stream of air is directed against mechanical housings affixed to the wheels of the airborne vehicle, said housing comprising a number of radially spaced surfaces symmetrically positioned about said housings and thus about said wheels of said airborne vehicle such that said stream of air is directed against said radially spaced surfaces imparting to same energy thereby causing said housings and said wheels upon which said housings are mounted to rotate, resulting in controlled rotations of the wheels of said airborne vehicle at the point of landing so as to commence rotation of said wheels at a rate equivalant to the landing speed of said airborne vehicle prior to its landing thereby eliminating excess wear of said tires on said airborne vehicle, as well as providing physical stabilization for said airborne vehicle at the time of landing.

Although prior systems concern themselves with seeking the reduction in tire wear of airborne vehicles by causing the rotating of said wheels to commence prior to the aircraft's actual landing, the present invention incorporates and utilizes a unique combination of components as well as design features which provide unique results heretofore unavailable from prior art devices.

In conjunction with the above, it is an object of this invention to create a new and unique system for reducing tire wear of airborne vehicles wherein there is diverted from the engines, or other source, of said airborne vehicle a stream of air whose velocity and other thermodynamic properties can be selectively controlled.

It is another object of this invention to provide a new and unique system for reducing tire wear of airborne vehicles wherein the optimum amount of energy is transferred from said stream of air to said mechanical housing affixed to the wheels of said airborne vehicle thereby providing a highly efficient mechanical system.

It is another object of this invention to provide a new and unique system for reducing tire wear of airborne vehicles wherein said mechanical housings are capable of being detachably mounted upon the existing wheel structures of airborne vehicles thus eliminating modification thereof.

It is another object of this invention to provide a new and unique system for reducing tire wear of airborne vehicles wherein said wheel housing are of a design so as to minimize air resistance once attached to the wheel of an airborne vehicle.

It is another object of this invention to provide a new and unique system for reducing tire wear of airborne vehicles wherein said mechanical housings affixed to the wheels of said airborne vehicle are composed of a number of radially spaced surfaces symmetrically positioned about said housings and aligned with the nozzle outlet from the means for diverting from an aircraft's engines, or other source, a stream of air, said optimum spacial relationship between said nozzle outlet and said blade surface being a distance equivalent to $\frac{1}{2}$ of the nozzle diameter.

It is another object of this invention to provide a new and unique system for reducing tire wear of airborne vehicles wherein said system is rugged in construction, efficient in operation and highly reliable.

It is another object of this invention to provide a new and unique system for enhancing airborne safety of airborne vehicles wherein there is utilized the controlled rotational movement of the wheels of said airborne vehicle to provide gyroscopic stabilization of said airborne vehicle relative to its surroundings at the time of landing.

It is another object of this invention to provide a new and unique system for reducing tire wear of airborne vehicles wherein said mechanical housings affixed to the wheels of said airborne vehicle are comprised of a number of radially spaced surfaces symmetrically positioned about said housings and aligned with the nozzle outlet from the means for diverting from an aircraft's engines, or other source, a stream of air, said spacial relationship between the blades of said mechanical housing having a mean straight line distance equivalent to $\sqrt{2}/2 \times$(nozzle diameter).

The objects and advantages of the invention are set forth in part herein and in part will be obvious herefrom, or may be learned by practice of the invention, the same being realized and attained by means of the instrumentalities and combinations pointed out in the appended claims.

SUMMARY OF THE INVENTION

Briefly described, the present invention is directed to a novel and unique system for enhancing airborne safety of airborne vehicles as well as reducing tire wear thereof, for airborne vehicles that require a runway upon which to land, said reduction in wear being achieved by causing the rotational movement of the airborne vehicle's wheels prior to contacting the runway surface, said rotational velocity being in the direction of movement of said airborne vehicle and at a rate equivalent to the ground speed of said airborne vehicle at the point of touchdown.

To achieve the above, means are provided for diverting from an aircraft's engines, or other source a stream of air such that said stream of air is directed against the radially spaced surfaces of the mechanical housings which are affixed to the wheels of the airborne vehicle, said housings comprising a number of radially spaced surfaces symmetrically positioned about said housings and thus about said wheels of said airborne vehicle such that upon directing said stream of air against said radially spaced surfaces energy is imparted to said spaced surfaces causing said housings and thus said wheels upon which said housings are mounted to rotate. By regulating the rate of flow of said stream of air there is the ability to regulate the rate of rotation of the wheels of said airborne vehicle.

As herein preferable embodied, there is designated a mechanical housing comprising two concentric circular members there being mechanically positioned between as well as affixed to each of said concentric members radially spaced surfaces symmetrically positioned about said housing the dimensions of said surfaces being such that the optimum height is $\sqrt{2}/2 \times$(nozzle diameter) and width thereof is $1.38 \times$(nozzle diameter), said nozzle diameters referring to the diameter of the nozzle opening that conducts said stream of air from the engines, or other source, of said airborne vehicle to said housing. Additionally, the optimum straight line mean spacing between said radially spaced surfaces appearing along the arc of said mean concentric circular member is equal to $\sqrt{2}/2$ multiplied by the diameter of said nozzle opening that conducts said stream of air from the engines of said airborne vehicle or other source to said housing.

As additionally herein preferably embodied, the optimum design criteria provides that the axis of the nozzle conducting said stream of air, a plane perpendicular to the axis of said mechanical housing and centered with regard to said housing and a point located at the center point of the blades of said mechanical housing when said blades are at the bottom of their rotational traverse about the axis of said mechanical housing together define a point in space whereby upon alignment of said various elements so as to define said point, optimum energy transfer from said stream of air to said mechanical housing is achieved.

Furthermore, in accordance with this invention, the angle as shown in FIG. 4 between the axis of said nozzle that conducts said stream of air from the engines of said airborne vehicle to said housing and the plane perpendicular to the axis of said mechanical housing should be between 40° and 60°, the optimum being 48° 11' 22.86" with the optimum distance as measured along the axis of said nozzle from the edge of said nozzle structure to the edge of said mechanical housing being equal to ½ of the diameter of said nozzle.

With the above design criteria existing as to the construction of said mechanical housing, said housing is then structurally affixed to the hub of a wheel by any means well known in the prior arts, be it by mechanical clamps so as to facilitate removal of said housing, or be it by welding so as to provide a permanent structure or otherwise.

DESCRIPTION OF A PREFERRED EMBODIMENT

Figure 1:
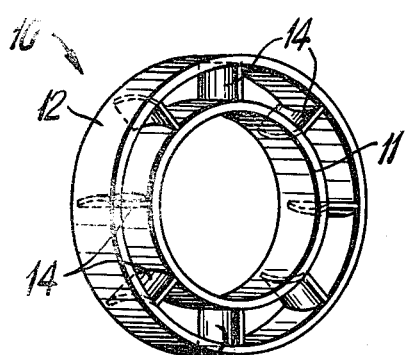
FIG. 1 is a three-dimensional perspective view of the mechanical housing utilized for reducing tire wear of airborne vehicles as constructed in accordance with the invention.

Referring now more particularly to the embodiment of the invention shown in the accompanying drawings, there is illustrated in FIG. 1 a three-dimensional perspective view of the mechanical housing utilized in the system for enhancing airborne safety of airborne vehicles as well as reducing tire wear thereof constructed in accordance with the invention wherein said mechanical housing is designated generally by designation 10, said mechanical housing 10 comprising a circular inner ring member 11 and a circular outer ring member 12, said ring members concentrically positioned about a common axis, blade members 14 being symmetrically positioned around the common axis of ring members 11 and 12, said blade members having opposite edges structurally affixed to ring members 11 and 12 thereby creating a rigid mechanical housing 10 in accordance with said invention.

Figure 5A:
FIG. 5a depicts one alternative design of said radially spaced surfaces of said mechanical housing capable of utilization therein in accordance with the invention.
Figure 5B:
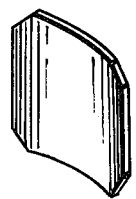
FIG. 5b depicts a second alternative design of said radially spaced surfaces of said mechanical housing capable of utilization therein in accordance with the invention.
Figure 5C:
FIG. 5c depicts a third alternative design of said radially spaced surfaces of said mechanical housing capable of utilization therein in accordance with the invention.

It should be noted that although blade members 14 are depicted in FIG. 1 of the preferred embodiment of a structural configuration so as to provide a curved plane surface, having as a horizontal cross sectional view a configuration defined as an arc while having as a vertical cross sectional view a configuration defined as rectangular, other configurations for said blade members are possible within the scope of this invention as will be more fully set forth hereinafter, nothing herein should be interpreted to so limit this invention to the above defined blade configuration as set forth as 14 in FIG. 1 and it is well within the scope of this invention to utilize blade members having configurations different than that depicted in FIG. 1 without deviating from the invention herein. As will be more particularly set forth hereinafter, and as depicted in FIGS. 5a-5c, there is therein illustrated a variety of configurations capable of utilization as blade members 14 for mechanical housing 10 of FIG. 1.

It should further be noted that although FIG. 1 illustrates a mechanical housing 10 wherein circular inner ring member 11 and circular outer ring member 12 are each depicted as a solid cylindrical surface, it is within the scope of this invention to vary the structural design of said ring members 11 and 12, by utilizing a structurally equivalent lattice arrangement, capable of providing equivalent structural integrity as that provided by said cylindrical members 11 and 12 as illustrated in FIG. 1 without deviating from the teaching of said invention. Furthermore, the composition of material utilized in fabricating mechanical housing 10 can be from any material currently known in the prior art which is capable of withstanding the structural and other forces associated therewith, said material being either metallic, ceramic or compositions or mixtures of any of the above, etc.

Figure 2:
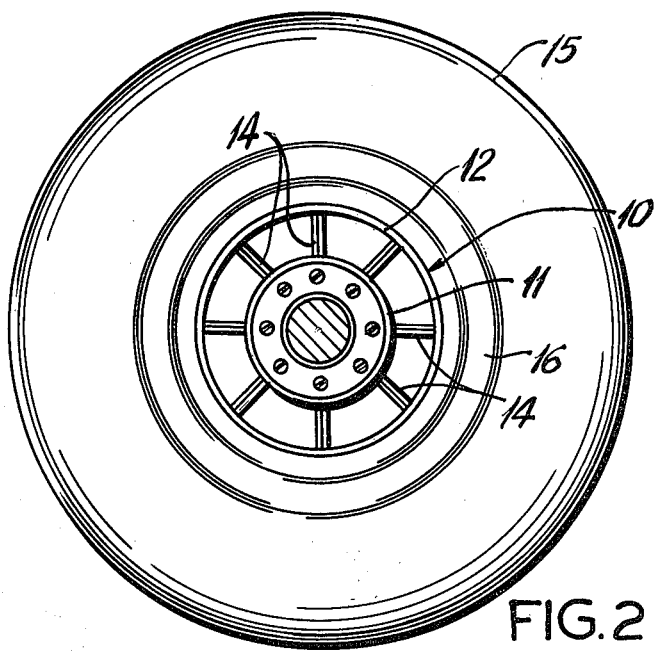
FIG. 2 is a front elevational view of a wheel utilized with airborne vehicles having affixed thereto the mechanical housing in accordance with the invention.

In keeping with the invention, there is illustrated in FIG. 2, mechanical housing 10 affixed to a wheel 15 and its rim member 16, said wheel 15 and rim 16 being representative of same as utilized on airborne vehicles, the affixing of mechanical housing 10 being in a fashion known within the prior art, be it either by permanent structural affixing as by welding, gluing or the like, or by selective detachable means through mechanical fasteners or the like.

Figure 3:
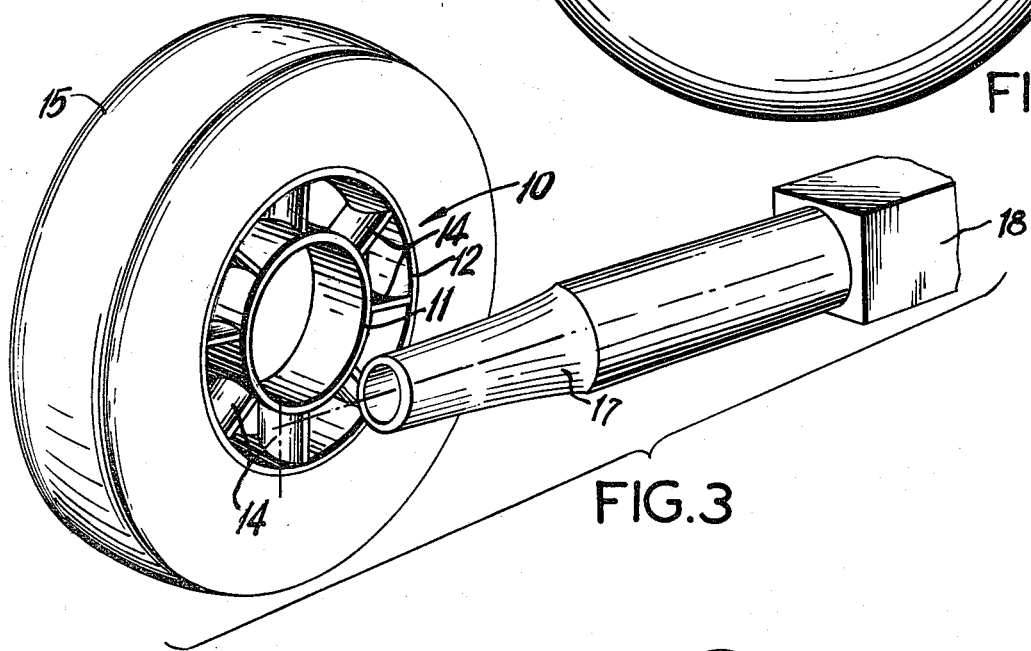
FIG. 3 is a three-dimensional perspective view of the mechanical housing depicted in FIG. 1 but mounted in accordance with the invention within the wheel of an airborne vehicle wherein there is additionally depicted the nozzle assembly utilized in accordance with the invention in relation with said mechanical housing and its respective blade members.
Figure 4:
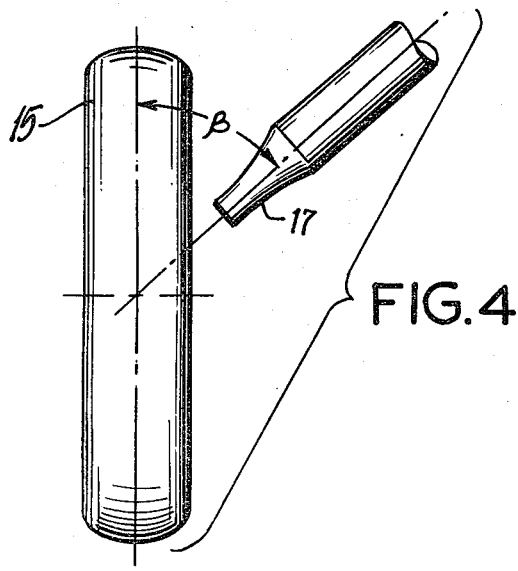
FIG. 4 is a partial top elevational view depicting the nozzle assembly which is utilized in accordance with the invention in relation to the mechanical housing and the wheel within which it is mounted.

As illustrated in FIG. 3, wheel housing 10 is structurally affixed to rim member 16 of wheel 15 and aligned with nozzle 17 such that a stream of air diverted from the airborne vehicle's engines or another source, at a pressure above ambient atmosphere is directed against blade members 14 so as to cause the imparting of kinetic energy to the blade members 14 thereby causing the rotational movement of mechanical housing 10 and thus wheel 15 about its axis.

By utilizing a control valve 18 or comparable means well known in the prior art heretofore utilized to control the flow of gaseous or liquid media, there is the ability to achieve a predetermined rate and direction of rotation for wheel 15 in accordance with the invention so that at the point of landing of an airborne vehicle, the wheels thereof can be rotated equivalent to the landing speed of said airborne vehicle thus eliminating excess tire wear as well as provide additional means for achieving the physical stabilization of said airborne vehicle.

With regard to the design and fabrication of mechanical housing 10 and the positioning of blade members 14 about said housing, it has become evident that an optimum design is achieved when the dimensions of blade members 14 as to height are $\sqrt{2}/2 \times$ (nozzle diameter) and as to width thereof are each $1.38 \times$ (nozzle diameter) said nozzle diameter referring to the diameter of the opening of nozzle 17 that conducts said stream of air from the engines of said airborne vehicle or other source to said housing. Additionally, the optimum straight line mean spacing between said blade members 14 appearing along the arc of said mean concentric circular member is achieved in accordance with the invention when said spacing is equal to $\sqrt{2}/2$ multiplied by the diameter of said nozzle opening that conducts said stream of air from the engines of said airborne vehicle to said housing. Furthermore, it has also become evident that the optimum design criteria for mechanical housing 10 results in there being only six (6) blade members 14 equally positioned about housing 10 and although in FIG. 1 there are depicted eight blade members 14 and same are discussed with reference to the preferred embodiment of the invention hereinbefore discussed, nothing should be construed to so limit said invention to such specific embodiment or optimum design criteria.

As additionally herein preferable embodied, the optimum design criteria provides that the axis of nozzle 17, a plane perpendicular to the axis of mechanical housing 10 and centered with regard to said housing and a point located at the center point of blade members 14 of said mechanical housing 10 when said blade members 14 are at the bottom of their rotational traverse about the axis of said mechanical housing 10 together define a point in space whereby upon alignment of said various elements so as to define said point, optimum energy transfer from said stream of air to said mechanical housing 10 is achieved.

Furthermore, in accordance with this invention, the angle between the axis nozzle 17 that conducts said stream of air from the engines of said airborne vehicle to mechanical housing 10 and the plane perpendicular to the axis of mechanical housing 10 should be between 40° and 60°, the optimum angle being 48° 11′ 22.86″ with the optimum distance as measured along the axis of nozzle 17 from the edge of said nozzle structure of the edge of said mechanical housing being ½ of the diameter of said nozzle.

Referring to FIGS. 5a, through 5c, there is illustrated alternative embodiments with regard to alternative structural configurations for blade members 14, FIG. 5a depicting a spheroid configuration for blade member 14, FIG. 5b depicting a trimmed squared configuration for blade member 14 and FIG. 5c depicting a squared configuration, it being specifically understood that any of the above referenced shapes can be utilized in alternative embodiments of the invention for blade members 14 without deviating from the intent thereof.

In actual operation, and in keeping with the invention, it is within the scope thereof that upon approaching a landing site, an airborne vehicle equipped with the invention herein described will have the wheels of said vehicle rotated as a result of the selective actuation of nozzle 17 by the opening of valve 18 such that a flow of air is directed against blade members 14 of housing 10 which is affixed to wheels 15 of said airborne vehicle, the kinetic energy level of said flow of air from nozzle 17 being such as to result in rotational movement of housing 10 and thus wheels 15 to a level equivalent to the ground speed of said airborne vehicle. As a result, upon contact between said rotating wheels 15 of said airborne vehicle and said runway, frictional wear of said wheels 15 is reduced.

Additionally, the rotational movement of said wheels while said airborne vehicle is airborne provides an added degree of safety by providing gyroscopic stability to said airborne vehicle prior to its landing.

The preceding description and accompanying drawings relate primarily to a specific embodiment of the invention, and the invention in its broader aspect should not be so limited to one specific embodiment as herein shown and described, but the departures may be made therefrom within the scope of the accompanying claims without departing from the principles of the invention and without sacrificing its chief advantages.

I claim:

1. A system for reducing tire wear of airborne vehicles that utilizes a nozzle outlet for directing a stream of air against blade members, said system comprising:
    (a) a housing comprising:
        (i) an inner circular ring member and an outer circular ring member, said ring members being concentrically positioned about a common axis;
        (ii) blade members symmetrically positioned about said common axis of said ring members, said blade members having their opposite edges structurally affixed to said ring members so as to create a rigid mechanical housing wherein said blade members define a curved plane surface having a horizontal cross section that is defined as an arc while having a vertical cross section configuration defined as rectangular, the spacing between said blade members being equally uniform between said blade members relative to any respective location on said blade members, said blade members, at a center point thereof, being $\sqrt{2}/2$ times the nozzle diameter of said nozzle outlet apart from each other as measured by the chord connecting said blade member center points and defined by an arc passing through the center points of said blade members whose radius is centered about said common axis of said inner circular ring member and said outer circular ring member, said radius being of a length equal to the distance from said common axis of said inner circular ring member and said outer circular ring member to the center point of said blade members;
(b) means for structurally affixing said housing to the rim of a wheel of an airborne vehicle;
(c) means for generating a stream of air;
(d) means for directing said stream of air against said blade members of said housing in a controlled fashion wherein a control valve is utilized within said means for directing said stream of air to selectively regulate the flow of said stream of air and a nozzle outlet is utilized within said means for directing said stream of air for channeling said stream of air against said blade members, said stream of air being channeled by said nozzle against said blade members at a point defined by the intersection of the axis of said nozzle outlet with a plane perpendicular to the axis of said housing and centered with regard to said housing and a point located at the center point of a blade member when said blade member is at the bottom of its rotational traverse about the axis of said housing, the angle between the axis of said nozzle outlet and a plane perpendicular to the axis of said housing being between 40° and 60°.

2. A system for reducing tire wear of airborne vehicles as defined in claim 1 wherein the spatial relationship between said nozzle outlet and said blade member when said blade member is at a point at the bottom of its rotational traverse about the axis of said housing is equal to ½ of said nozzle diameter.

3. A system for reducing tire wear of airborne vehicles as defined in claim 1 wherein the height of said blade members is equal to $\sqrt{2}/2$ times nozzle diameter.

4. A system for reducing tire wear of airborne vehicles as defined in claim 1 wherein the width of said blade members is equal to 1.38 times said nozzle diameter.

5. A system for reducing tire wear of airborne vehicles as defined in claim 1 wherein said blade members depict a curved plane surface having a horizontal cross section that is defined as an arc while having a vertical cross section configuration defined as a square.

6. A system for reducing tire wear of airborne vehicles as defined in claim 1 wherein said blade members additionally have the corners thereof removed so as to define a hexangular shape.

* * * * *